(No Model.) 6 Sheets—Sheet 3.
B. G. LOCKETT, J. W. ENGLISH & J. W. MURPHEY.
BRICK DRYING KILN.
No. 295,026. Patented Mar. 11, 1884.
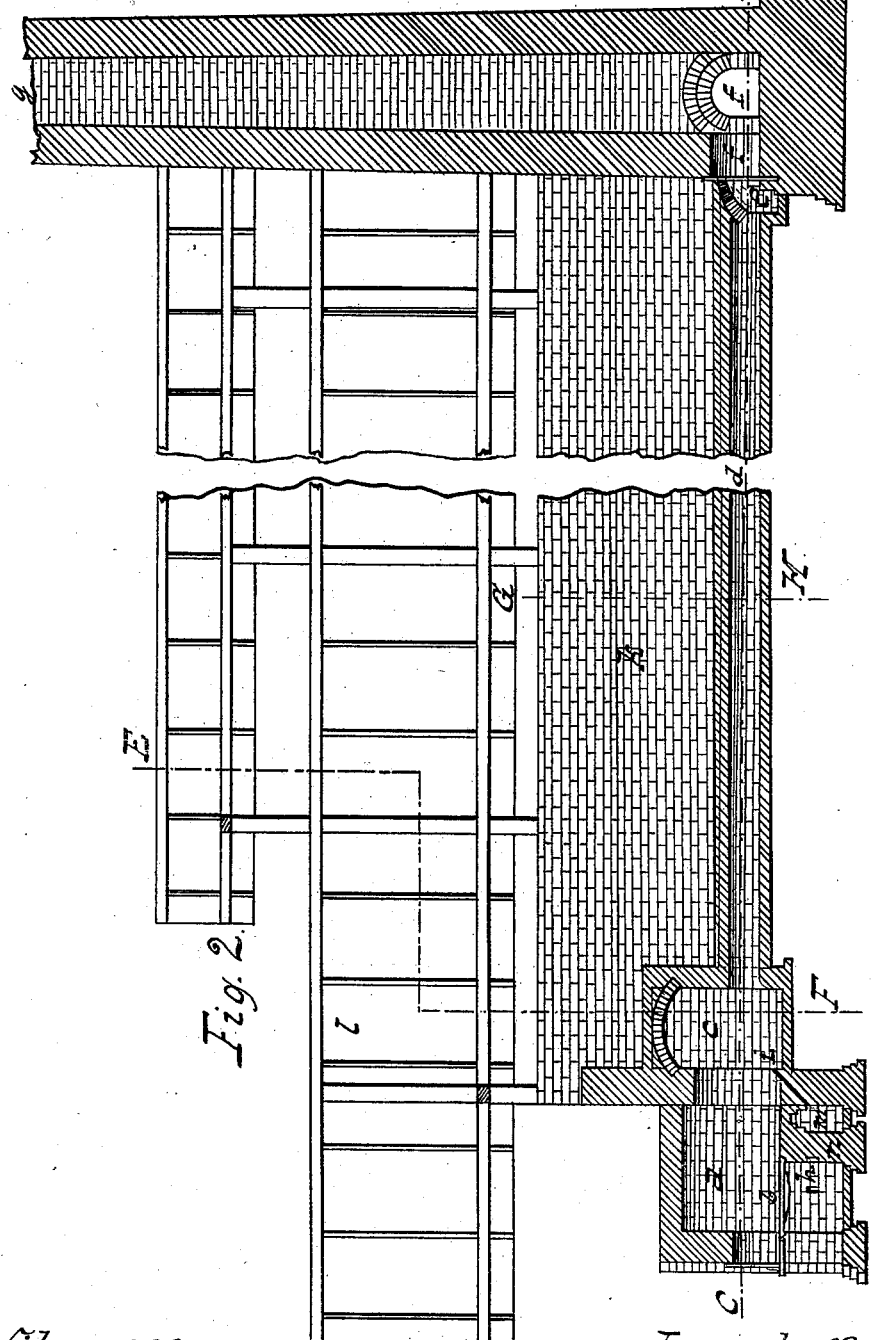

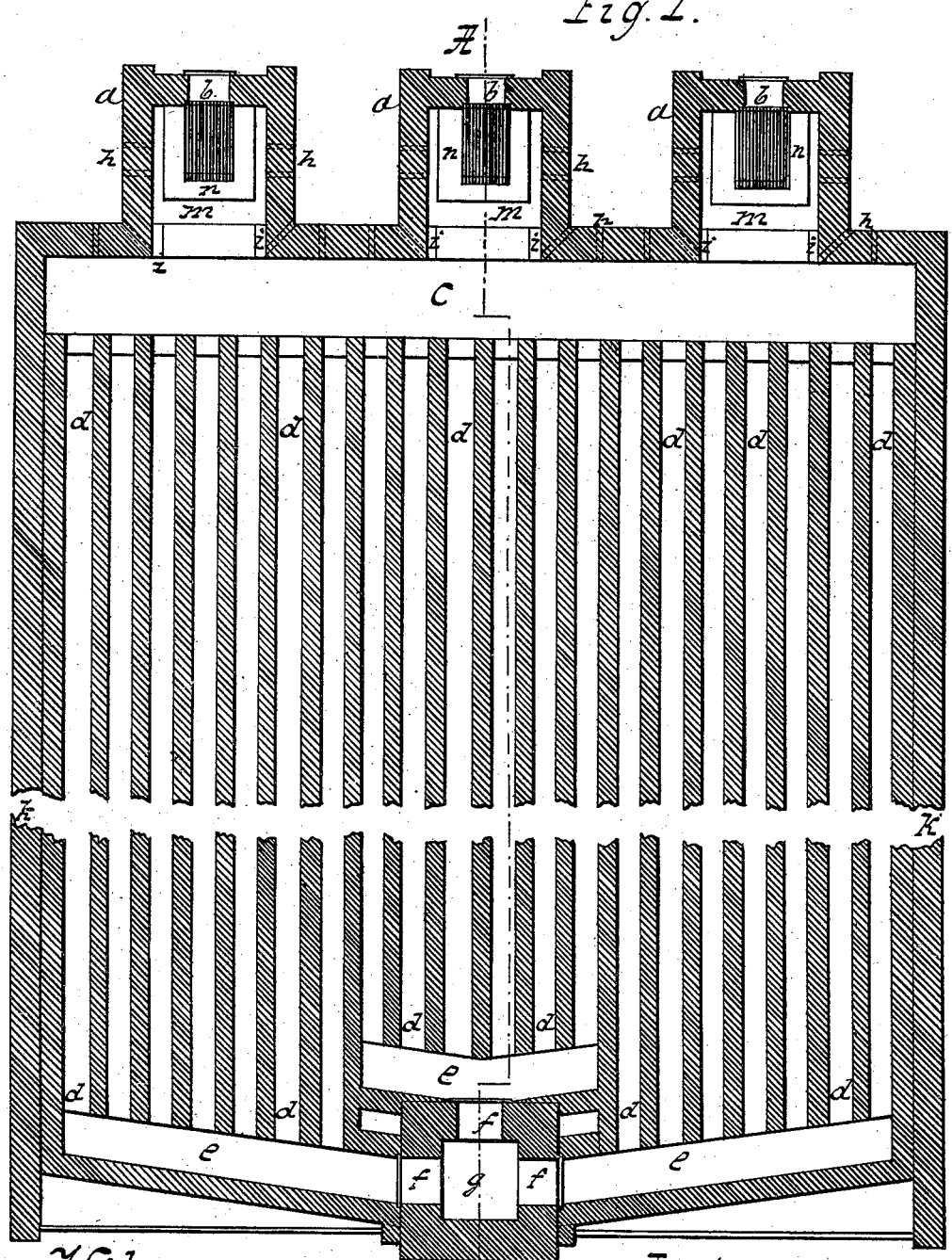

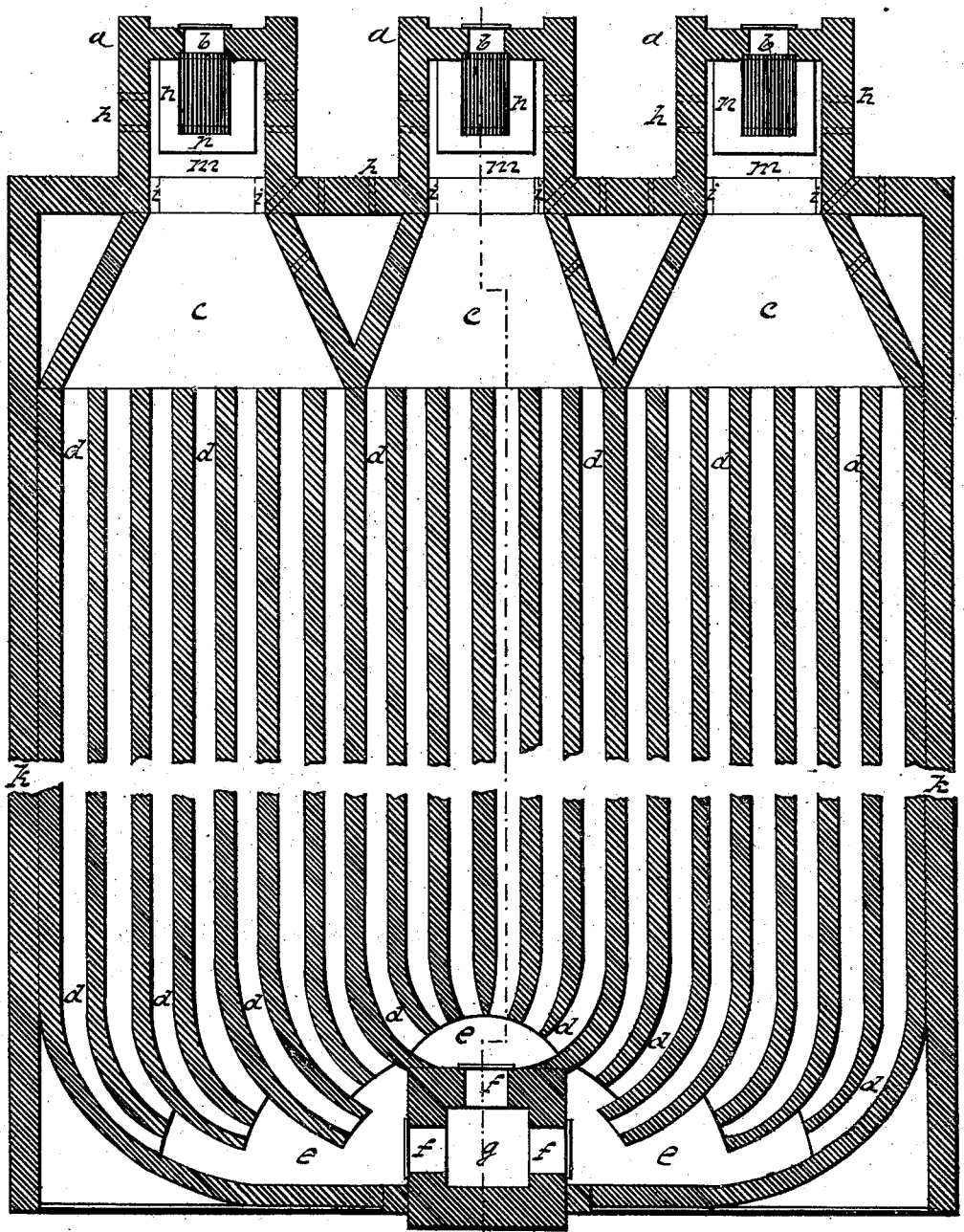

(No Model.) 6 Sheets—Sheet 4.
B. G. LOCKETT, J. W. ENGLISH & J. W. MURPHEY.
BRICK DRYING KILN.
No. 295,026. Patented Mar. 11, 1884.
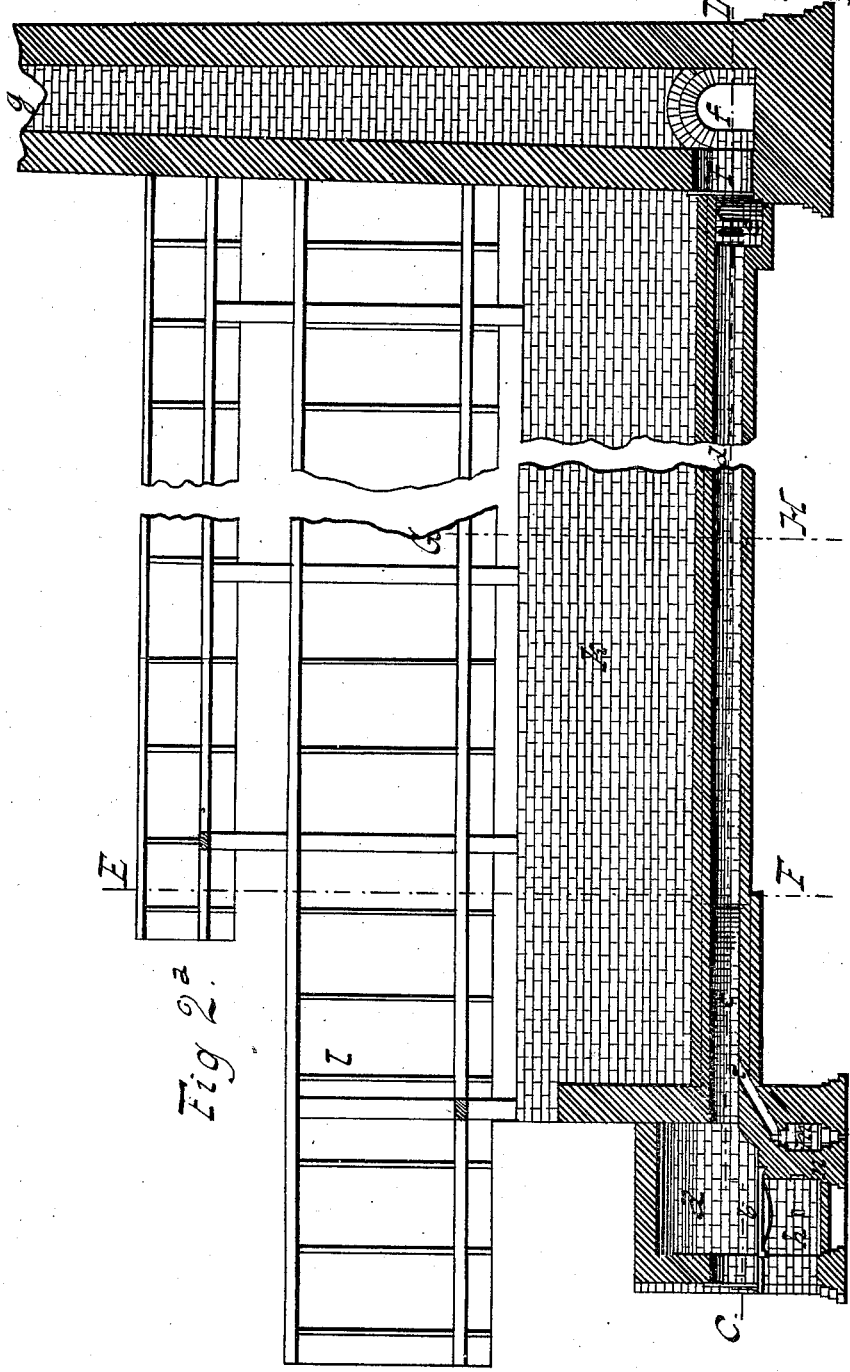
Witnesses
Robert L Rodgers
Gust. E. Leo
Inventors.
B. G. Lockett
J. W. English
John W. Murphey (No Model.) 6 Sheets—Sheet 5.
B. G. LOCKETT, J. W. ENGLISH & J. W. MURPHEY.
BRICK DRYING KILN.
No. 295,026. Patented Mar. 11, 1884.
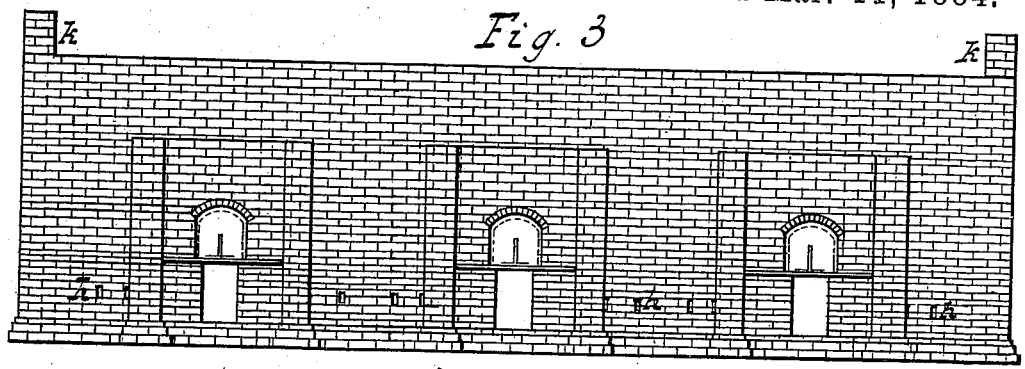
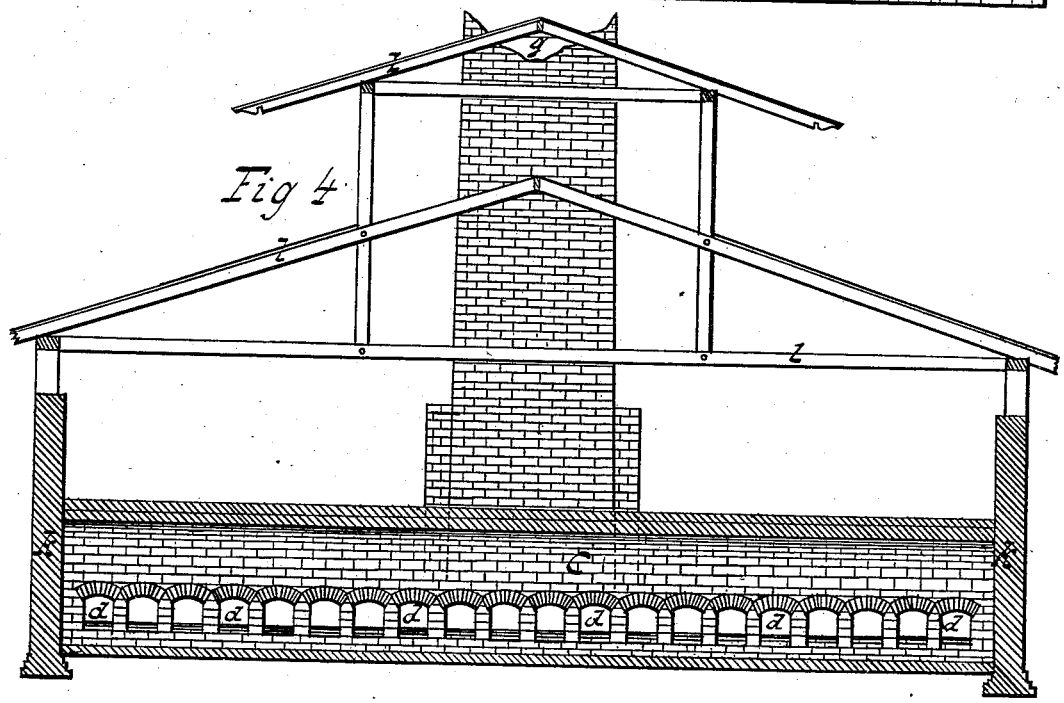
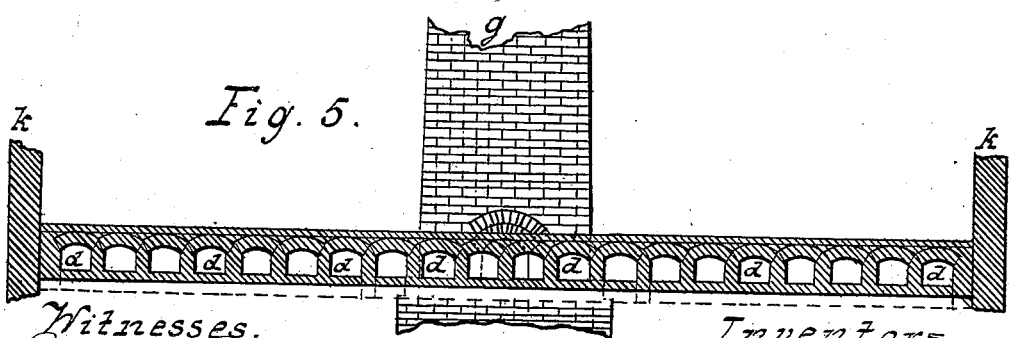
Witnesses.
Robert L. Rodgers
Gust. E. Leo
Inventors.
B. G. Lockett
J. W. English
John W. Murphey (No Model.) 6 Sheets—Sheet 6.

B. G. LOCKETT, J. W. ENGLISH & J. W. MURPHEY.
BRICK DRYING KILN.

No. 295,026. Patented Mar. 11, 1884.

Witnesses.
Robert L. Rodgers
Gust. E. Leo

Inventors.
B. G. Lockett
J. W. English
John W. Murphey

United States Patent Office.

BENJAMIN G. LOCKETT, JAMES W. ENGLISH, AND JOHN W. MURPHEY, OF ATLANTA, GEORGIA.

BRICK-DRYING KILN.

SPECIFICATION forming part of Letters Patent No. 295,026, dated March 11, 1884.

Application filed September 21, 1883. (No model.)

*To all whom it may concern:*

Be it known that we, BENJAMIN G. LOCKETT, JAMES W. ENGLISH, and JOHN W. MURPHEY, citizens of the United States, residing at Atlanta, in the county of Fulton and State of Georgia, have invented certain new and useful Improvements in Brick-Drying Kilns; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a brick-drying kiln in which moist fresh-made bricks can be rapidly and uniformly dried, without regard to the weather, before being placed in the burning-kiln; and it consists in the construction and arrangement of flues and other devices for distributing heat, as hereinafter more fully set forth.

Figure 3:
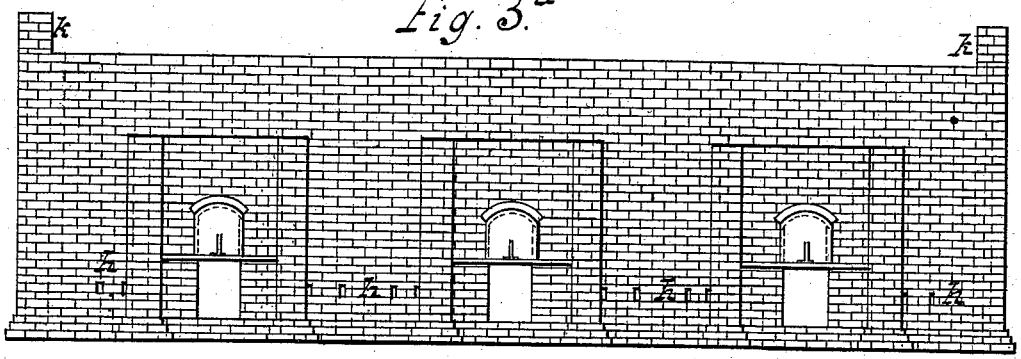
Figure 4:
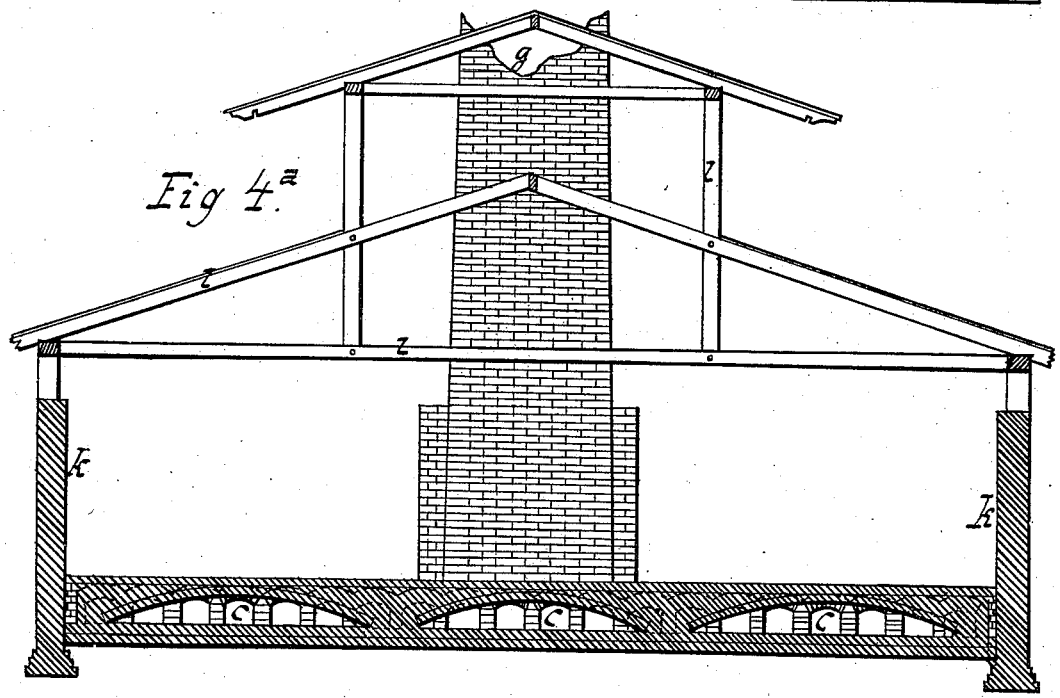
Figure 5:
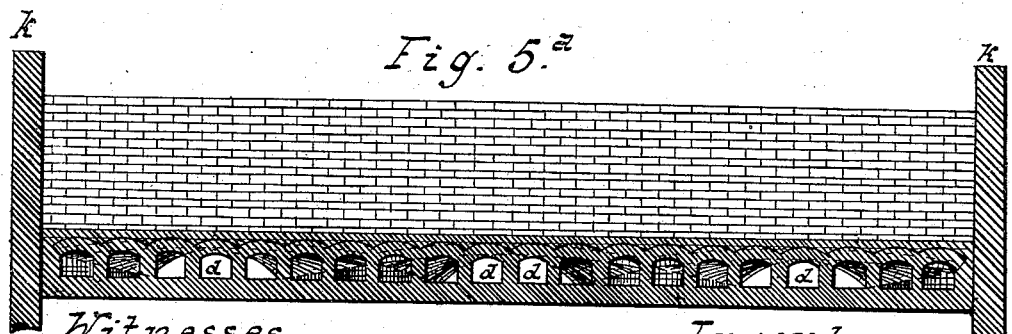

In the annexed drawings, Figure 1 is a horizontal section of our improved drying-kiln on the line C D, Fig. 2. Fig. 1ª is a similar section on the line C D of Fig. 2ª, representing a modification. Fig. 2 is a vertical section of the kiln on the line A B, Fig. 1. Fig. 2ª is a similar section on the line A B of the modification represented in Fig. 1ª. Figs. 3 and 3ª represent front views of the kiln and its modification, respectively, both being alike. Figs. 4 and 4ª are vertical cross-sections on the lines E F of Figs. 2 and 2ª, respectively. Fig. 5 is a vertical cross-section of the hot-air flues on the line G H of Fig. 2, looking from the front of the kiln to its back; and Fig. 5ª is a vertical cross-section of the modification of the kiln on the line G H of Fig. 2ª, looking from the back to the front of the kiln.

Similar letters refer to similar parts throughout the several views.

The firing-box *a* projects out in front of the front wall of the drying-kiln, and is constructed of sufficient width to burn the necessary quantity of fuel on the grate *b*. This firing-box is lined all around with fire-bricks, and is overarched with the same material. The fuel is introduced by an opening in front of the firing-box, that can be closed by a cast-iron door which slides sidewise in a groove on an iron plate. Under the grate is arranged the usual ash-hole. The fire will have its natural draft backward to the smoke-stack *g*, and will pass through the overarched opening in the front wall of the drying-kiln into the fire-box, in back of the front wall, entering the channel *c*. The number of fire-boxes is entirely immaterial, and depends only on the general dimensions of the drying-kiln and the surface of floor to be heated, and may vary from a single one to any number. In the channel *c* (which either may be constructed as shown in Figs. 1, 2, and 4, reaching across the entire width of the drying-kiln, and built with upright walls of fire-bricks, with an arch of the same material to cover it, or, as represented in Figs. 1ª, 2ª, 4ª, and 5ª, divided into a certain but not limited number of sections, which spread gradually as they extend from the fire-boxes, and having a flat arch of fire-bricks to cover) is produced an immense draft by the introduction of cold air through the different cold-air flues *h*, which go partly direct into the channel *c*, intersecting the front wall of the kiln, or first enter the cold-air chamber *m* through the walls of the fire-box, and from there through the openings *i*, into the channel *c*. The current of drafts so produced forces the heated air into the flues *d*. The number of these flues to each fire-box is not limited, and may vary from five to eight each, more or less; but they should be placed as near as possible together, in order to heat every part of the surface of the floor to an equal degree. The length of these flues is of no influence, but should not extend farther than the air-current in the same remains heated. It is further immaterial whether they run straight, as represented in Fig. 1, or are curved, as illustrated in the modification by Fig. 1ª. All the flues are built with plumb side walls, and are overarched with fire-bricks, the spaces between the arches on the upper surface being made level with clay, and a flat layer of bricks laid in clay placed quite level on top, making a perfect and smooth surface of the floor of the drying-kiln. The smoke and the hot air, after they have passed the flues *d*, are accumulated into the channels *e*, which are constructed either as represented in Fig. 1 or as in Fig. 1ª, according to the construction of the flues. These channels unite a certain number of flues, so that some of them may be closed by a damper near $f$ in front of the entrance into the smoke-stack. This arrangement permits a partial use of the drying-kiln when only one or not all of the fire-boxes are active. The side wall, $k$, of the drying-kiln and the roofing $l$ serve to keep the weather from the kiln. The rear of the kiln is closed by a movable plank partition, which will be taken out when entering or extracting the bricks from the kiln. The roofing is constructed in the common way, but arranged so as to be tight-closed up to the side walls during the progress of drying; or it may be provided with rolling-slat ventilators to be opened to allow the evaporation to escape. The fresh manufactured bricks are rolled directly from the brick-machine by hand-cars into the kiln after the back partition has been removed, and are laid either flat or edgewise, with a small space between them, on the heated floor. After the moisture from the bricks has escaped, the kiln will be closed and the bricks will remain in the kiln until they are dry enough to be placed into the burning-kiln, which is generally the case in from eight to ten hours. Then the ready-dried bricks will be taken out and the kiln refilled.

The most profitable dimensions of the surface of the floor of the drying-kiln is about thirty feet in width by a length of one hundred feet; but any enlargement or reduction of those figures will not affect the usefulness of the drying-kiln.

We are aware that prior to our invention brick-drying kilns have been constructed in which, by the use of heat-flues, and other parts appearing in our invention, bricks, for the purpose of being burned afterward, have been dried. We therefore do not claim such construction, broadly; but What we do claim as our invention, and desire to secure by Letters Patent, is—

The combination, in a brick-drying kiln, of the fire-boxes $a\ a$, front hot-air space or spaces, $c\ c$, cold-air chambers $m$, having draft-openings $h\ i$, rear hot-air passages, $e\ e\ e$, disconnected from each other, the longitudinal flues $d\ d$, and the chimney $g$, having valved openings $f\ f\ f$, communicating with the rear hot-air passages and flues, whereby hot air is accumulated at the back end of any or all of said flues, substantially as shown and described.

In testimony whereof we affix our signatures in presence of two witnesses.

BENJAMIN G. LOCKETT.
JAMES W. ENGLISH.
JOHN W. MURPHEY.

Witnesses:
GUST. E. LEO,
E. I. RENICK.